United States Patent [19]

Hornung

[11] 3,769,868

[45] Nov. 6, 1973

[54] TRANSVERSE CUTTING MACHINE
[75] Inventor: Hans Hornung, Zwingenberg, Germany
[73] Assignees: Dr. Otto C. Strucker K.G., Darmstadt-Eberstadt; Maschinen fabrik zum Bruderhaus G.m.b.H., Rautlingen, Wuerttemberg, Germany
[22] Filed: Apr. 19, 1971
[21] Appl. No.: 135,318

[52] U.S. Cl. .................................. 83/348, 83/674
[51] Int. Cl. ............................................ B23d 25/12
[58] Field of Search ..................... 83/348, 508, 658, 83/674, 675, 677, 694, 698

[56] References Cited
UNITED STATES PATENTS

| | | | |
|---|---|---|---|
| 3,196,724 | 7/1965 | Frank | 83/674 X |
| 3,008,366 | 11/1961 | Taylor, Jr. | 83/348 X |
| 3,244,049 | 4/1966 | Smith et al. | 83/674 X |
| 3,153,967 | 10/1964 | Williams et al. | 83/675 |
| 3,073,198 | 1/1963 | Clem | 83/675 X |

FOREIGN PATENTS OR APPLICATIONS

| | | | |
|---|---|---|---|
| 1,441,546 | 5/1966 | France | 83/348 |

Primary Examiner—Andrew R. Juhasz
Assistant Examiner—Leon Gilden
Attorney—Mason, Kolehmaien, Rathburn & Wyss

[57] ABSTRACT

A transverse cutting machine has stationary and rotatable blade supports and blades with the stationary blade projecting into the path of rotation of the rotating blade a distance of around 0.1 millimeter. One of the blades is fixed in its support, and the other blade is fixed on its support against movement in the direction of the cutting force. This other blade is formed with a curved surface at one end leading into its cutting edge so that, on contact with the fixed blade, it displaces or deflects in a direction normal to the direction of the cutting force against a pressurized fluid bias provided by an expansible, pressurized tube which also affords a quick release for blade changing. Because of the permitted deflection, blade tolerances during set-up are not critical, and the control exercised over the fluid bias permits easy adjustment of cutting forces. In one embodiment, the biased blade is the rotatable blade, and in another embodiment, the biased blade is the stationary blade.

11 Claims, 4 Drawing Figures

INVENTOR:
HANS HORNUNG,
BY: Mason, Kolehmainen, Rathburn, & Wyss,
ATTORNEYS.

TRANSVERSE CUTTING MACHINE

The invention relates to a blade arrangement for a transverse cutter, and, more specifically, to a machine for cutting continuous webs of paper, plastic, or similar material into sheets.

Such a transverse cutter has a stationary blade or knife, and a rotating blade. The blades are arranged transverse to the web. They are not exactly parallel but are arranged at a small angle to one another in such a way that the cut proceeds progressively across the web in the manner of a cut made by a pair of scissors. The length of the blades, determined by the width of the web, can be as much as several meters.

For obtaining a clean cut, it is necessary to adjust the blades relatively to one another in such a way that they are in contact during the whole cutting operation and take up the cutting forces uniformly. Heretofore, on each replacement of the blades, the cutting edges had to be adjusted to an accuracy or tolerance of 0.01 millimeters. The time required to do this is considerable and can amount to several hours.

The object of the invention is to simplify the adjustment of the blades and to reduce the adjustment time considerably.

The main feature of the invention resides in that one of the blades is rigidly or unyieldingly supported in the direction of its plane or face, i.e., substantially in the direction of the applied cutting force, and that this blade is yieldingly supported in a direction perpendicular to the plane of the blade in such a way that it can be deflected from a neutral position which is defined by a stop face.

Another feature of the invention resides in the provision of controllable means, preferably pneumatic or hydraulic, for biasing the blade against the stop.

Further features will be apparent from considering the following description in conjunction with the drawings in which.

Figure 1:
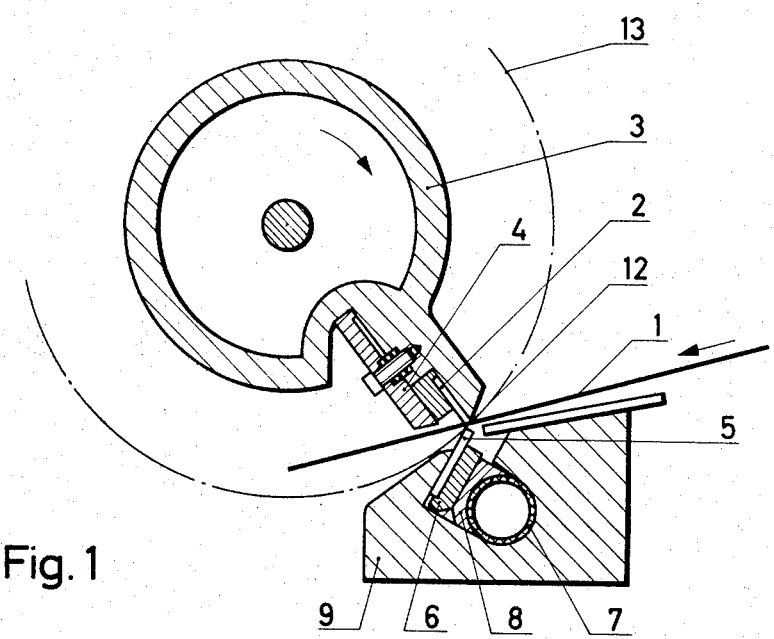
FIG. 1 is a cross sectional view of a transverse cutter illustrating a drum blade and a beam blade.

FIG. 1 illustrates the passing of the web to be severed through the transverse cutter. A rotating upper blade 2 is attached to a rotatable blade drum 3 in a known manner using fasteners and a holding plate 4 which is elongated in the direction of the axis of rotation of the drum 3.

Figure 4:
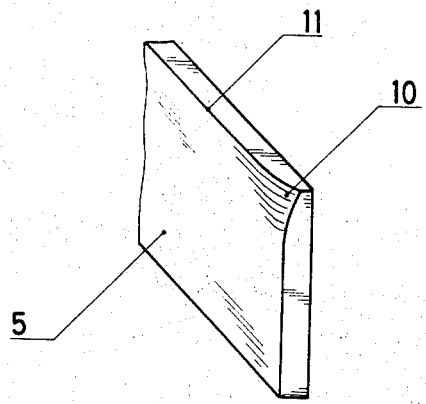
FIG. 4 is a fragmentary perspective view of a cutter blade with the curved surface at one side and adapted for use in the cutters of FIGS. 1 and 3.

A stationary lower blade 5 is attached to or mounted on a blade support or beam 9. The blade 5 is illustrated in FIG. 4 and includes curved, ground surfaces 10 at one end of the blade 5 which merge into an edge of the top surface that forms a cutting edge 11. The blade 5 is mounted (FIG. 2) in a recess in or a shelf on a holding strip 6 with the curved surface 10 facing away from the direction in which the blade 2 moves toward the blade 5 and with the edge 11 protruding around 0.1 millimeter into a circular path 13 scribed by a cutting edge 12 on the moving blade 2. The blade 5 carried on the strip 6 is pressed against a stop face of the blade beam 9. A force for biasing or pressing the outer face of the blade 5 against the stop face of the beam is provided by an expansible hose 7 which is arranged in a corresponding recess of the blade beam 9. A force coupling or intermediate member 8 movably carried on the beam 9 is disposed between the blade 5 and the hose 7 and includes a longitudinal recess receiving the hose 7. The hose 7 is connected through a conventional control valve (not shown) with a conventional air or fluid pressure source (not shown).

At the beginning of a cutting operation, the moving upper blade 2 engages and runs over the curved, ground end surface 10 (FIG. 4) of the cutting edge 11 of the lower blade 5. A little later the cutting edge 11 (FIG. 4) of the lower blade and the cutting edge 12 (FIG. 1) of the upper blade come into contact. Since the cutting edge 11 of the lower blade enters the circular path 13 of the cutting edge 12 of the upper blade by an amount of 0.1 millimeter, the lower blade 5 is pushed or cammed back a little.

More specifically, the lower blade 5 is fixedly supported against forces which act in the direction of the arrow A (FIG. 2), i.e., in the direction of the face or plane of the blade and perpendicular to the blade face. As the blades 2 and 5 move into contact, the first contact is between the blade 2 and, generally, the central portion of the top surface of the blade 5 (see FIG. 2). The blade 2, adjacent one end, thus engages the adjacent curved end of the cutting edge 11 resulting from the curved surface 10. This produces a component of force acting in the direction B (FIG. 2) which pivots, cams, or deflects the blade 5 to the right toward a position shown in dashed outline in FIG. 2., against the bias of the pressure chamber or hose 7. This tilted or deflected position has been exaggerated in FIG. 2 for clarity. The direction A corresponds substantially to the direction of the cutting force, i.e., the circular path 13 at the cutting edge 12. The air pressure in the hose 7 insures that a uniform force presses the cutting edges 11, 12 of the blades 2, 5 together.

In the blade arrangements known heretofore, the cutting edges had to be adjusted at each replacement to an accuracy of 0.01 millimeter, i.e., the lower blade protrudes or projects by this amount into the circular path 13 of the edge 12 of the rotating upper blade 2.

With the blade arrangement according to the invention, the adjustment occurs only once, viz., when assembling the machine. The necessary accuracy is about 0.1 millimeter. This can be increased up to 0.2 millimeter. The edges need not be reground. Preferably, the blades are made with four cutting edges and are discarded after use. The blades have been accurately machined and need only be inserted into the holding means. The time consumption for a replacement of the blades amounts to about ten minutes.

Furthermore, in the case of an unsatisfactory (not smooth) cut, the blades previously had to be readjusted with the machine stopped. With the blade arrangement according to the present invention, it is possible to increase the pressure of the cutting edges 11, 12 by raising the pressure within the hose 7 while the machine is running. Furthermore, it is possible to reduce the pressure of the edges (e.g., when cutting thin webs) with the effect of considerably reducing the wear of the edges 11, 12.

Figure 2:
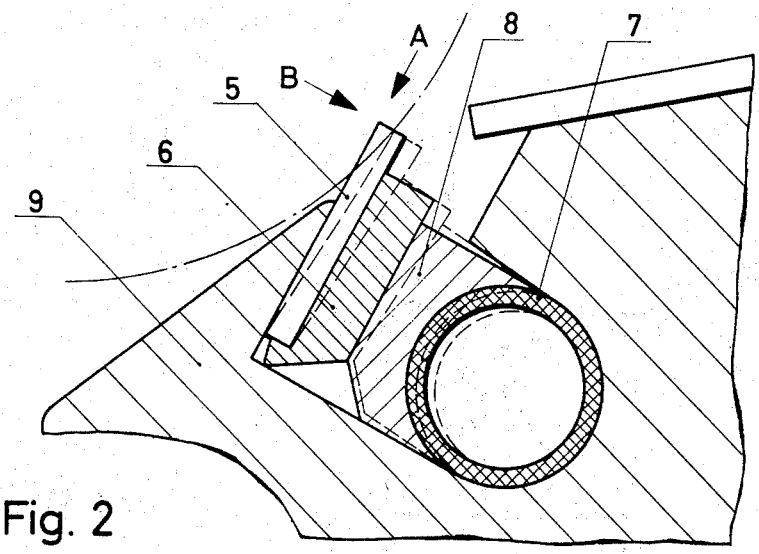
FIG. 2 is an enlarged sectional view of the beam blade shown in FIG. 1.
Figure 3:
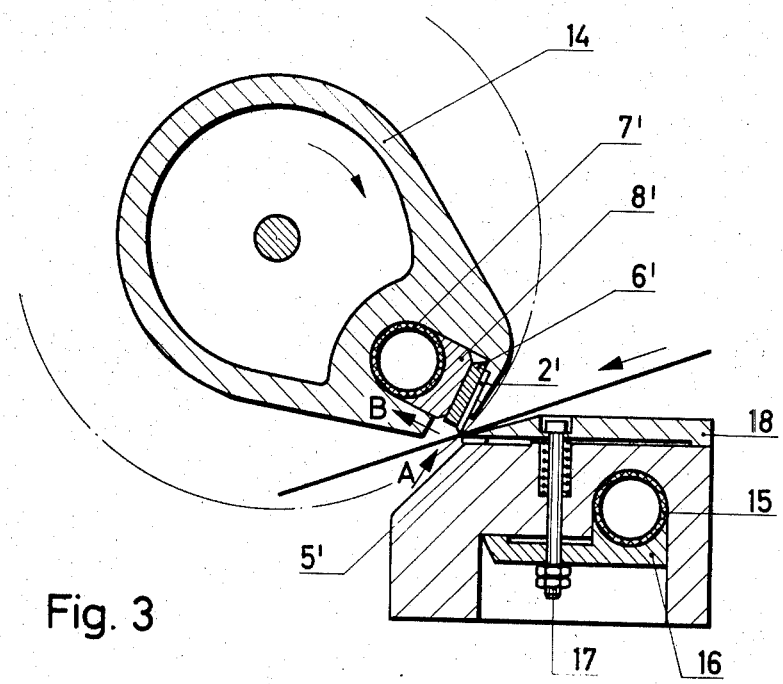
FIG. 3 is a cross sectional view of another transverse cutter embodying the invention.

FIG. 3 discloses a modified embodiment of the invention in which the upper or rotating blade is supported yieldingly. In the embodiment of FIG. 3, parts similar to parts of the embodiment of FIGS. 1 and 2 are designated by like reference numbers with a prime "'." The upper blade 2' made like the blade 5 contacts a holding strip 6' and is pressed by an air pressurized hose 7' against a stop face of a blade drum 14. A lower blade 5' is held in place by a pneumatic or pressurized fluid clamping means which consist substantially of a pressurized and expansible hose 15, an intermediate member or lever 16, a bolt 17, and a holding plate 18. Expansion of the hose 15 moves the coupled or connected members 16, 17, and 18 downwardly to clamp the blade 5' in position. The pneumatic clamping means permit a rapid replacement of the lower blade by reducing the air pressure. If desired, the fluid biasing means 7, 7' and 15 could be replaced by other biasing means such as adjustable spring or resilient biasing assemblies.

Although the present invention has been described by reference to two embodiments, it will be apparent that numerous other modifications and embodiments may be devised by those skilled in the art that fall within the spirit and scope of the principles of this invention.

What is claimed as new and desired to be secured by Letters Patent of the United States is:

1. A transverse cutting machine comprising a movable blade supporting structure, a first cutting blade carried on the movable supporting structure and having a cutting edge movable through a given path during movement of the movable supporting structure, a stationary supporting structure, a second cutting blade carried on the stationary supporting structure and having a cutting edge projecting into said given path to cause contact between the first and second blades, first mounting means mounting one of said first and second blades on its supporting structure, and second mounting means for mounting the other of the first and second blades on its supporting structure, said second mounting means holding the blade substantially against movement in the direction of the cutting force developed by contact between the first and second blades and mounting the blade for movement along its entire length in the same direction generally perpendicular to the direction of said cutting force, said second mounting means including biasing means acting on the blade to permit movement of the blade along its entire length against the bias in a direction generally perpendicular to the direction of said cutting force.

2. The transverse cutting machine set forth in claim 1 including a stop surface on the supporting structures associated with the second mounting means and biasing means biasing the blade against the stop surface to position the biased blade in a normal position.

3. The transverse cutting machine set forth in claim 2 in which the supporting structure associated with the second mounting means includes a recess extending generally transverse to said given path and having a wall forming said stop surface, said second mounting means and said biasing means being disposed in said recess.

4. The transverse cutting machine set forth in claim 3 in which the biasing means includes an elongated and expansible pressurized fluid chamber extending generally parallel to the blade.

5. The transverse cutting machine set forth in claim 1 in which the biasing means includes a variable pressure fluid chamber.

6. The transverse cutting machine set forth in claim 5 in which the variable pressure fluid chamber includes an expansible chamber defining member extending generally parallel to the blade along an appreciable part of the length of the blade.

7. The transverse cutting machine set forth in claim 1 in which the cutting blade mounted by the second mounting means includes a curved surface at one end merging into the cutting edge and facing toward the cutting blade mounted by the first mounting means as the first and second cutting blades move into contact.

8. The transverse cutting machine set forth in claim 1 in which the movable blade supporting structure is mounted for rotary movement.

9. The transverse cutting machine set forth in claim 8 in which the second mounting means is carried on the movable blade supporting structure.

10. The transverse cutting machine set forth in claim 8 in which the second mounting means is carried on the stationary blade supporting structure.

11. The transverse cutting machine set forth in claim 1 in which the second mounting means includes a rigid supporting surface, blade holding means carrying the blade and engaging the rigid supporting surface to substantially prevent movement of the blade and blade holding means in said direction of the cutting force, said rigid supporting surface and said blade holding means defining a pivotal support permitting movement of the blade and blade holding means along the length of the blade in said direction generally perpendicular to the direction of the cutting force by acting against said biasing means.

* * * * *